US008760274B2

(12) United States Patent
Boling et al.

(10) Patent No.: US 8,760,274 B2
(45) Date of Patent: Jun. 24, 2014

(54) SYSTEM FOR COMMUNICATING BETWEEN A TRAILER TRACKING DEVICE, A TRUCK TRACKING DEVICE, AND A CENTRAL MONITORING STATION

(71) Applicant: Spireon, Inc., Knoxville, TN (US)

(72) Inventors: Brian M. Boling, Knoxville, TN (US); Ezra T. Peachey, San Diego, CA (US)

(73) Assignee: Spireon, Inc., Knoxville, TN (US)

( * ) Notice: Subject to any disclaimer, the term of this patent is extended or adjusted under 35 U.S.C. 154(b) by 0 days.

(21) Appl. No.: 13/688,694

(22) Filed: Nov. 29, 2012

(65) Prior Publication Data

US 2013/0147617 A1    Jun. 13, 2013

Related U.S. Application Data

(60) Provisional application No. 61/567,786, filed on Dec. 7, 2011.

(51) Int. Cl.
*G08B 21/00* (2006.01)
*G08B 1/00* (2006.01)

(52) U.S. Cl.
USPC .......... 340/431; 340/531; 340/933; 307/10.1; 180/167

(58) Field of Classification Search
USPC .............. 340/431, 531, 933, 425.5, 435–438, 340/440, 441, 447, 452, 463, 465, 466, 479, 340/5.81, 944, 993, 988; 307/9.1, 10.1; 180/167, 168; 280/432, 442, 445; 701/1, 2, 23, 29, 47, 70
See application file for complete search history.

(56) References Cited

U.S. PATENT DOCUMENTS

| | | | |
|---|---|---|---|
| 7,040,435 B1* | 5/2006 | Lesesky et al. | 180/167 |
| 7,760,077 B2* | 7/2010 | Day | 340/431 |
| 2006/0261935 A1* | 11/2006 | McAden | 340/431 |
| 2007/0241868 A1* | 10/2007 | Fackrell et al. | 340/431 |
| 2010/0223090 A1* | 9/2010 | Lozito | 705/9 |

* cited by examiner

*Primary Examiner* — Anh V La
(74) *Attorney, Agent, or Firm* — Luedeka Neely Group, P.C.

(57) ABSTRACT

When a cargo trailer is coupled to a truck, a trailer tracking device on the trailer acquires an identifier of a truck tracking device attached to the truck. The trailer tracking device then transmits a message to a central server indicating that the trailer is coupled to the truck, which message includes the identifiers of the two tracking devices. The central server associates the identifiers of the two tracking devices in a database. When the trailer is decoupled from the truck, the trailer tracking device transmits a message to the central server indicating that the trailer is decoupled. The trailer tracking device then goes into a sleep mode until the trailer is again coupled to a truck, a predetermined time interval expires, a motion sensor indicates trailer movement, location coordinates indicate a geofence violation, or a low battery voltage condition occurs. Upon any of these events, the trailer tracking device wakes up and transmits to the central server a message indicating which situation caused the transmission and including the location coordinates of the trailer.

19 Claims, 3 Drawing Sheets

SYSTEM FOR COMMUNICATING BETWEEN A TRAILER TRACKING DEVICE, A TRUCK TRACKING DEVICE, AND A CENTRAL MONITORING STATION

RELATED APPLICATIONS

This application claims priority to U.S. provisional patent application Ser. No. 61/567,786, filed Dec. 7, 2011, titled "System for Communicating between a Trailer Tracking Device, a Truck Tracking Device, and a Central Monitoring Station."

FIELD

This invention relates to the field of tracking the location of vehicles and cargo trailers in transit. More particularly, this invention relates to a system for coordinating communication of information between a tracking device on a truck, a tracking device on a trailer which may be pulled by the truck, and a central monitoring station.

BACKGROUND

Each day, thousands of trucks travel over the nation's highways towing thousands of cargo trailers carrying millions of dollars worth of cargo. At any given time, many thousands more cargo trailers are not connected to trucks, but are parked in storage lots after decoupling from the trucks that towed them to their current locations, awaiting connection to the trucks that will tow them to their next destinations. Keeping track of the status and location of each of these thousands of cargo trailers represents a significant record-keeping burden for shipping, trucking and logistics companies.

What is needed is a system for providing automatic, seamless and reliable communications between trucks and the trailers to which they are connected, between trailers and a central monitoring station of a monitoring service provider, and between trucks and the central monitoring station for the reporting of location and status information.

SUMMARY

The above and other needs are met by a system for communicating between a trailer tracking device, a truck tracking device, a central server of a monitoring service provider, and a customer device. In a preferred embodiment, when a trailer is initially coupled to a truck, the trailer tracking device acquires an identification number of the truck tracking device via a short-range communication interface and acquires location coordinates using a GPS module. The trailer tracking device then transmits a message via a long-range communication interface to the central server indicating that the trailer is coupled to the truck, which message includes the identification number of the trailer tracking device, the identification number of the truck tracking device, the location coordinates, and a time stamp. The central server then associates the identification number of the trailer tracking device with the identification number of the truck tracking device in a database maintained by the monitoring service provider.

When the trailer is decoupled from the truck, the trailer tracking device transmits a message to the central server indicating that the trailer is decoupled, which message includes the identification number of the trailer tracking device, the location coordinates, and a time stamp. The trailer tracking device then goes into a sleep or low-power mode until one or more of the following happen: (1) the trailer becomes coupled to a truck; (2) a predetermined reporting time interval expires; (3) a motion sensor indicates the trailer has moved; (4) location coordinates from the GPS module indicate the trailer has moved outside a geofence; or (5) battery voltage in the trailer tracking device drops below a threshold level. Upon occurrence of any of these events, the trailer tracking device wakes up and transmits a message to the central server, which message indicates the situation that caused the transmission and includes the location coordinates of the trailer and a time stamp.

BRIEF DESCRIPTION OF THE DRAWINGS

Further advantages of the invention are apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1:
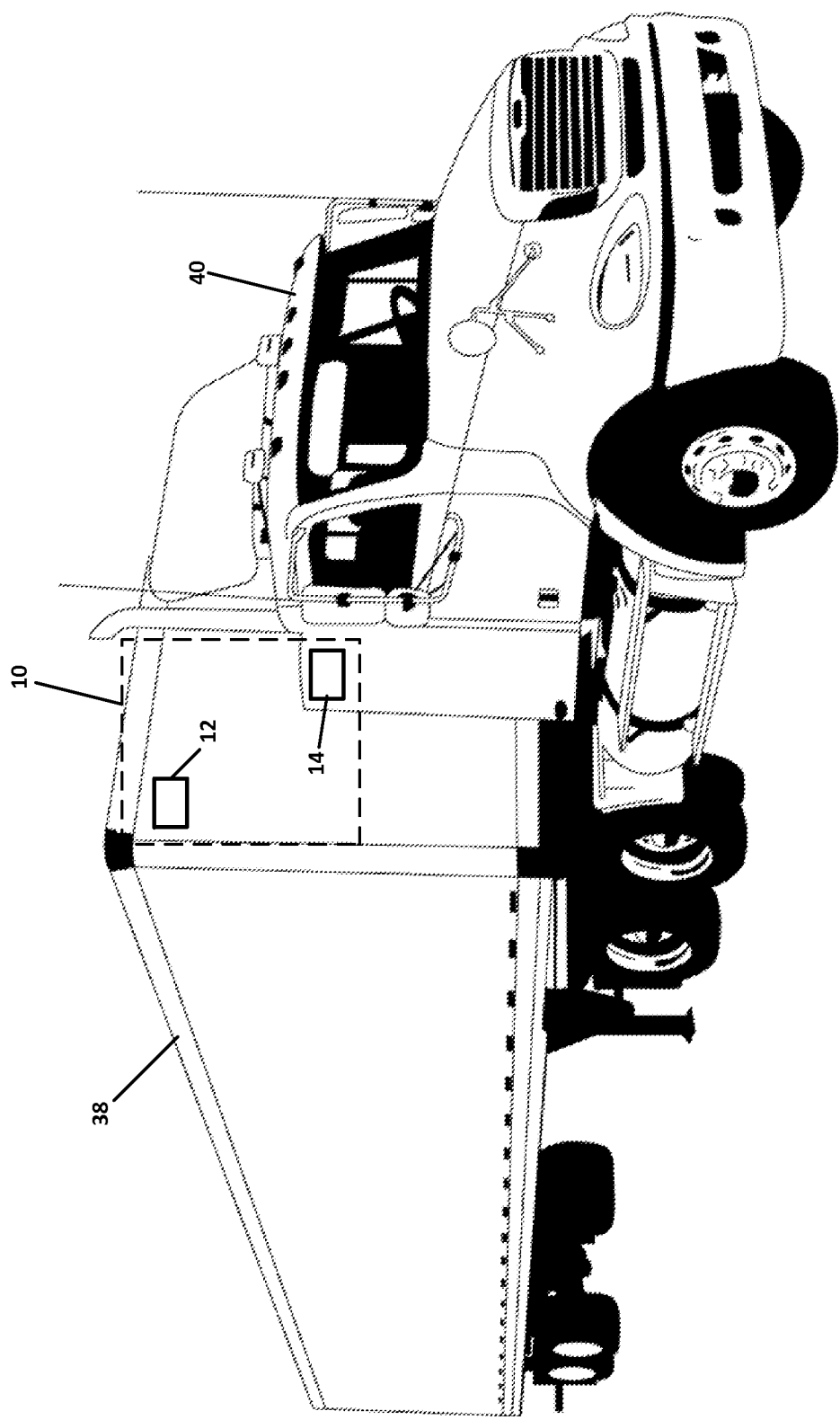
FIGS. 1 and 2 depict a system for communicating between a trailer tracking device, a truck tracking device, a central monitoring station of a monitoring service provider, and a customer device according to an embodiment of the invention.

As shown in FIG. 1, a communication system 10 includes a trailer tracking device 12 attached to a cargo trailer 38 and a truck tracking device 14 attached to a truck 40 (also referred to as a tractor) configured to haul the trailer 38.

Figure 2:
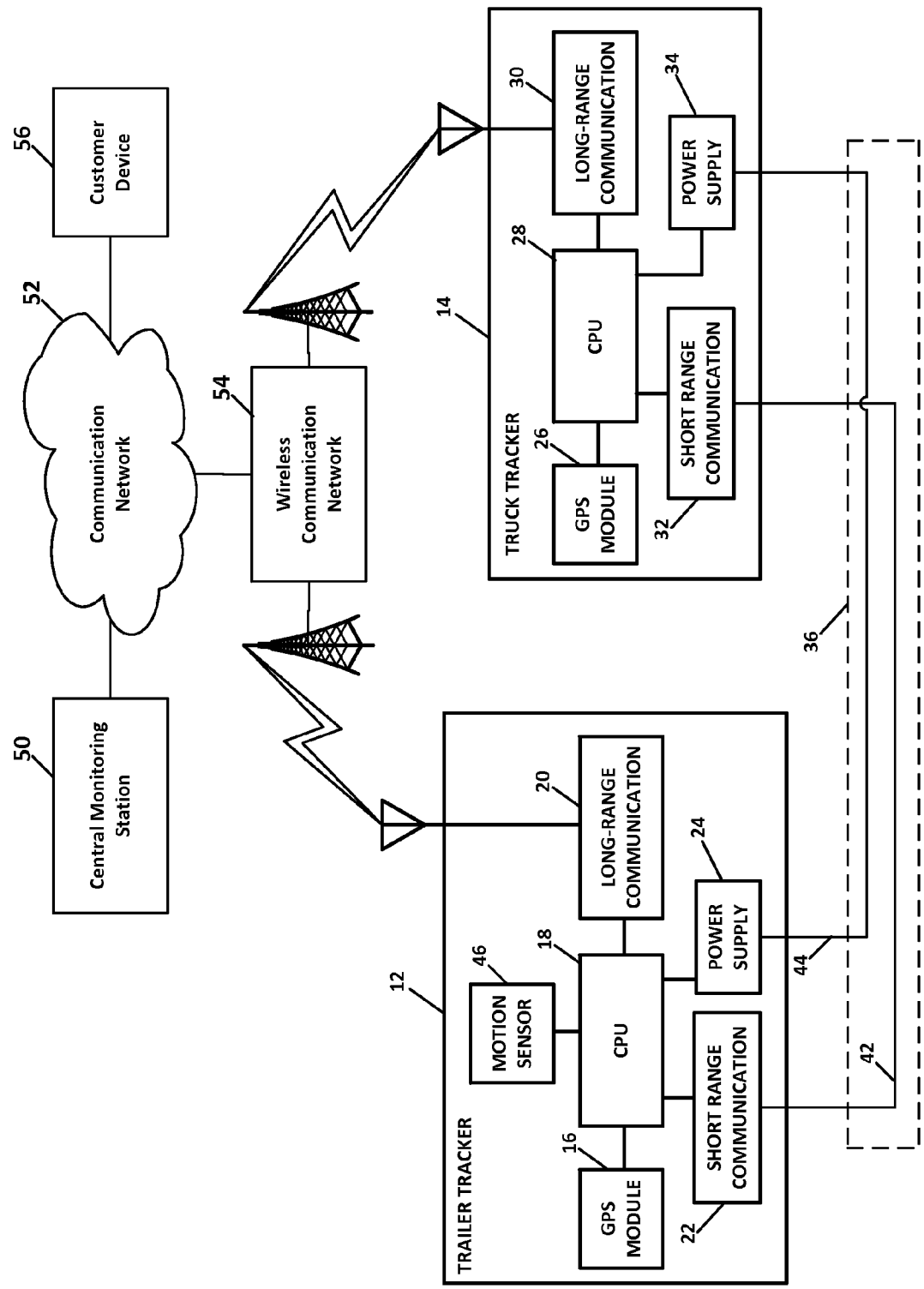

As shown in FIG. 2, the trailer tracking device 12 and the truck tracking device 14 communicate with a service provider's central monitoring station 50 via a wireless communication network 54, such as a cellular network or Wi-Fi network, and a wide area communication network 52, such as the Internet. The central monitoring station 50 is also referred to herein as the central server. The central monitoring station 50 is also operable to communicate with a customer device 56 via the network 52 or the network 54. The customer device 56 may be a computer, a tablet, or a smartphone through which a customer entity receives communications from the service provider. The customer entity may be a subscriber to asset tracking and monitoring services provided by the service provider.

A preferred embodiment of the trailer tracking device 12 includes a Global Positioning System (GPS) module 16, a central processing unit (CPU) 18, a long-range communication interface 20, a short-range communication interface 22, a power supply 24, and a motion sensor 46. Similarly, a preferred embodiment of the truck tracking device 14 includes a GPS module 26, a CPU 28, a long-range communication interface 30, a short-range communication interface 32, and a power supply 34.

The GPS module 16 determines location coordinates of the trailer tracking device 12 based on timing signals received from GPS satellites. These location coordinates may be communicated to the CPU 18 for storage in associated memory or to the long-range communication interface 20 to be transmitted to the central monitoring station 50 of the monitoring service provider. In some embodiments, the location of the trailer tracking device 12 may be determined based on the presence of a given Wi-Fi network or a particular cellular tower detected by the long-range communication interface 20.

The CPU 18 of the trailer tracking device 12 executes instructions to make decisions and direct communications between the trailer tracking device 12 and the truck tracking device 14 and the central monitoring station 50. In preferred embodiments, memory associated with the CPU 18 stores a unique identification/serial number assigned to the trailer tracking device 12.

The long-range communication interface 20 of the trailer tracking device 12 comprises a wireless RF transceiver, such as cellular modem, a satellite modem and/or a Wi-Fi modem, for providing two-way wireless communications between the trailer tracking device 12 and the central monitoring station 50. In embodiments that include multiple modems for wireless communication with the central monitoring station 50, the CPU 18 activates the appropriate wireless modem based on the current availability of wireless networks, with the order of preference determined based on the air-time cost of the available wireless networks. For example, Wi-Fi may be assigned highest priority based on lowest cost, while satellite may be assigned lowest priority based on highest cost.

The short-range communication interface 22 of the trailer tracking device 12 comprises a wired and/or wireless transceiver for providing two-way short-range communications between the trailer tracking device 12 and the truck tracking device 14. In wireless embodiments, the short-range communication interface 22 comprises an RF transceiver, such as a Bluetooth or Wi-Fi or RFID transceiver. In wired embodiments, the short-range communication interface 22 may include an RS-232 link or Universal Serial Bus (USB) link or other well-known wired interface configuration. In some preferred embodiments of the trailer tracking device 12, the short-range communication interface 22 includes both a wireless transceiver and a wired communication interface.

The trailer tracking device 12 includes a power supply 24 that receives and conditions power from the truck power supply when the trailer 38 is tethered to the truck 40. The power supply 24 includes a backup battery for providing power to the trailer tracking device 12 when the trailer 38 is not tethered to the truck 40. In some embodiments, the power supply 24 also includes a solar panel for providing a charging voltage to the backup battery.

With continued reference to FIG. 2, the GPS module 26 of the truck tracking device 14 determines location coordinates of the truck tracking device 14 based on timing signals received from GPS satellites. These location coordinates may be communicated to the CPU 28 for storage in associated memory or to the long-range communication interface 30 to be transmitted to the central monitoring station 50. In some embodiments, the location of the truck tracking device 14 may be determined based on the presence of a given Wi-Fi network or a particular cellular tower detected by the long-range communication interface 30.

The CPU 28 of the truck tracking device 14 executes instructions to make decisions and direct communications between the truck tracking device 14, the trailer tracking device 12 and the central monitoring station 50. In preferred embodiments, memory associated with the CPU 28 stores a unique identification/serial number assigned to the truck tracking device 14.

The long-range communication interface 30 of the truck tracking device 14 comprises a wireless transceiver, such as cellular modem, satellite modem, or WiFi modem, for providing two-way long-range wireless communications between the truck tracking device 14 and the central monitoring station 50. In embodiments that include multiple modems for wireless communication with the central monitoring station 50, the CPU 28 activates the appropriate wireless modem based on the current availability of wireless networks, with the order of preference determined based on the air-time cost of the available wireless networks as discussed above.

The short-range communication interface 32 of the truck tracking device 14 comprises a wired and/or wireless transceiver for providing two-way short-range communications between the truck tracking device 14 and the trailer tracking device 12. In wireless embodiments, the short-range communication interface 32 comprises an RF transceiver, such as a Bluetooth or Wi-Fi or RFID transceiver. In wired embodiments, the short-range communication interface 32 may include an RS-232 link or Universal Serial Bus (USB) link or other well-known wired interface configuration. In some preferred embodiments of the truck tracking device 14, the short-range communication interface 32 includes both a wireless transceiver and a wired communication interface.

The truck tracking device 14 includes a power supply 34 that receives and conditions power from a truck power supply when the truck tracking device 14 is installed in the truck 40. The power supply 34 may also include a backup battery for providing power to the truck tracking device 14 when the truck tracking device 14 is not installed in the truck 40, or if power from the truck power supply fails.

Typically, when the cargo trailer 38 is coupled to the truck 40, an electrical harness is connected from the truck's electrical system to the trailer's electrical system. As shown in FIG. 2, such an electrical harness 36 may provide a wired electrical connection 42, such as an RS-232 link or USB link, between the short-range communication interface 22 in the trailer tracking device 12 and the short-range communication interface 32 in the truck tracking device 14. In alternative embodiments, the short range communication link between the short-range communication interface 22 and the short-range communication interface 32 may be implemented by modulating a communication signal onto a power line in the electrical harness 36.

The harness 36 preferably includes a power connection 44 between the power supply 24 in the trailer tracking device 12 and the power supply 34 in the truck tracking device 14. In preferred embodiments, when the harness 36 is connected between the truck 40 and the trailer 38, the power supply 24 of the trailer tracking device 12 receives power from the power supply 34 of the truck tracking device 14 or from the electrical system of the truck 40. Thus, when the harness 36 is connected between the truck 40 and the trailer 38, the battery of the power supply 24 can be recharged by the power supply 34 of the truck tracking device 14 or the electrical system of the truck 40. The electrical harness 36 is an optional feature included in some embodiments of the invention, and is not required to provide the communication functions described herein.

In preferred embodiments, communications between the trailer tracking device 12 and the truck tracking device 14 take place via the short-range communication interfaces 22 and 32. In alternative embodiments, communications between the trailer tracking device 12 and the truck tracking device 14 may be routed through the central monitoring station 50 via Wi-Fi, wireless cellular or satellite links.

Figure 3:
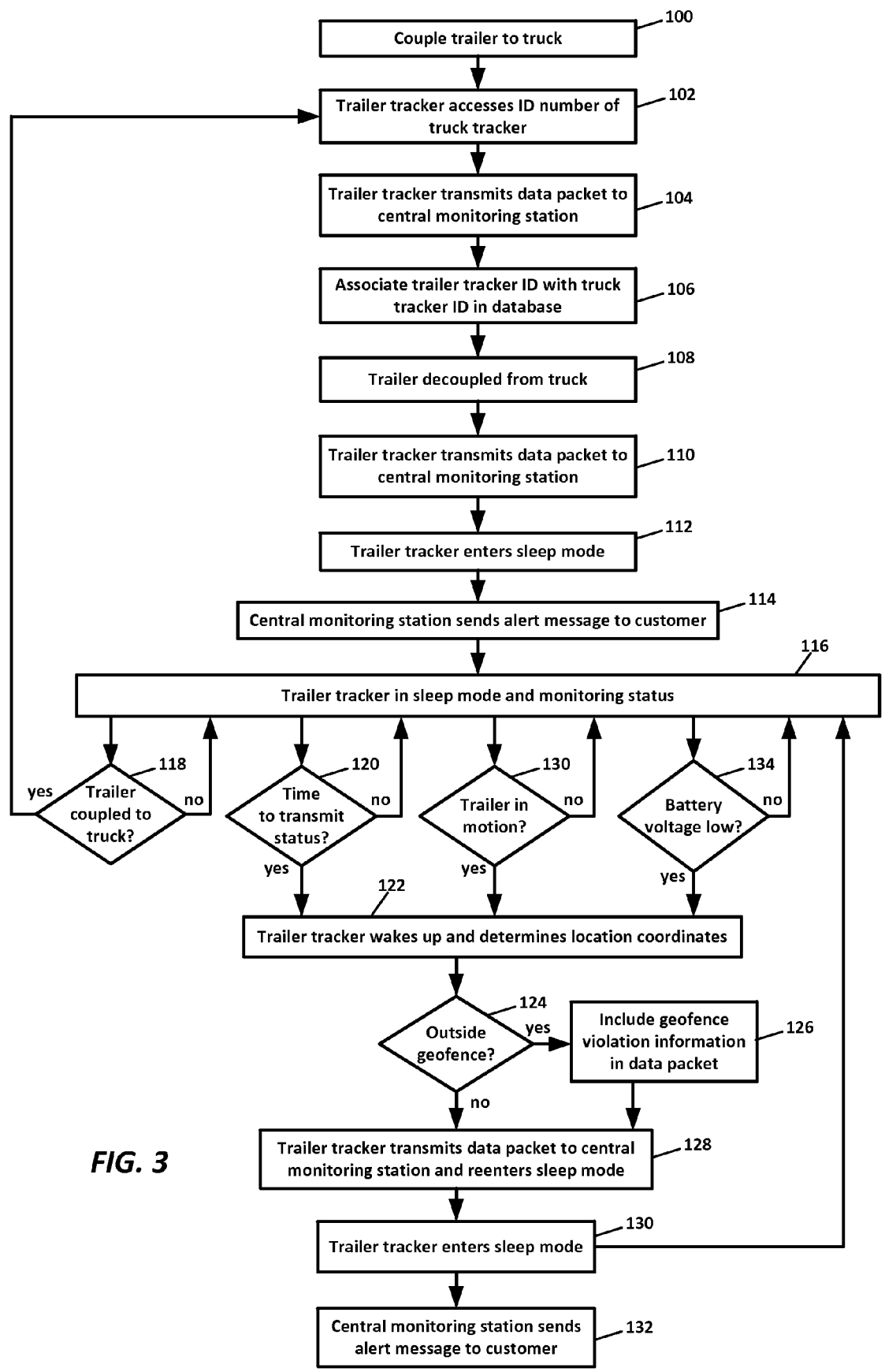
FIG. 3 depicts a flow chart of a method for communicating between a trailer tracking device, a truck tracking device, a central monitoring station of a monitoring service provider, and a customer device according to an embodiment of the invention.

In a preferred embodiment of a communication process depicted in FIG. 3, when a trailer 38 is coupled to a truck 40 and the harness 36 is initially connected (step 100), the trailer tracking device 12 accesses the unique identification/serial number of the truck tracking device 14 via the short range communication interfaces 32 and 22 (step 102). The trailer tracking device 12 then transmits a first data packet via the long-range communication interface 20 to the central monitoring station 50 indicating that the trailer 38 and truck 40 are coupled (step 104). This first data packet preferably includes the unique identification/serial number of the trailer tracking device 12, the unique identification/serial number of the truck tracking device 14, current location coordinates acquired from the GPS module 16, and a time stamp. The association of these two unique identification/serial numbers and the location coordinates and time stamp are stored in a database of the central monitoring station 50 (step 106). The first data packet may also include information indicating that the transmission was initiated by the coupling of the trailer 38 to the truck 40.

In embodiments having no wired harness connection between the trailer tracking device 12 and the truck tracking device 14, communications between the two units may be via Bluetooth, Wi-Fi, RFID, or other wireless communication means when the units come into proximity of each other. In these embodiments, the presence of the wireless signal between the short-range communication interfaces 22 and 32 is used to indicate coupling of the trailer 38 to the truck 40.

After transmission of the first data packet, the CPU 18 of the trailer tracking device 12 preferably enters a sleep mode wherein the various components of the device 12 are powered down or put into a low-power state. While in the sleep mode, one ongoing function provided by the CPU 18 is to sense whether the trailer 38 is coupled to the truck 40, such as via the harness 36 or wireless means.

When the trailer 38 becomes decoupled from the truck 40 (step 108), the CPU 18 senses the disconnection and "wakes up" the GPS module 16 and the long-range communication interface 20, and the GPS module 16 acquires location coordinates of the trailer 38. The trailer tracking device 12 then transmits a second data packet via the long-range communication interface 20 to the central monitoring station 50 indicating that the trailer 38 and truck 40 have been disconnected (step 110). This second data packet preferably includes the unique identification/serial number of the trailer tracking device 12, the unique identification/serial number of the truck tracking device 14, the current location coordinates, a value indicating that the transmission was initiated based on disconnection from the truck, and a time stamp. After transmitting the second data packet, the trailer tracking device 12 reenters the sleep mode (step 112) and begins monitoring status (step 116).

Upon receipt of the second data packet, the central monitoring station 50 may send an alert message to the customer device 56, such as via email or text message, indicating that the trailer to which the tracking device 12 identified in the second data packet is installed has been decoupled from the tractor (step 114). The alert message may also indicate the location of the tracking device 12. Whether or not this or any other alert message is sent to the customer device 56 is determined by stored customer preferences.

Preferably, while in the sleep mode after decoupling from the truck 40, one ongoing function provided by the CPU 18 of the trailer tracking device 12 is monitoring whether the trailer 38 becomes coupled to a truck 40 (step 118). If coupling to a truck is detected, the trailer tracking device 12 accesses the unique identification/serial number of the truck tracking device 14 via the short range communication interfaces 32 and 22 (step 102), and the process continues as depicted in FIG. 3.

While in the sleep mode after decoupling from the truck 40, another ongoing function provided by the CPU 18 of the trailer tracking device 12 is a timer function (step 120) to determine time intervals at which the tracking device 12 wakes up and acquires its location coordinates (step 122), and transmits a third data packet to the central monitoring station 50 (step 128). In a preferred embodiment, the transmission interval of the third data packet is once per day. The third data packet preferably includes at least the location coordinates of the trailer 38, the unique identification/serial number of the trailer tracking device 12, a value indicating that the transmission was made at a regular transmission interval, and a time stamp. The third data packet may also include a battery voltage value indicating the voltage level of the backup battery of the power supply 24. After transmitting the third data packet, the trailer tracking device 12 reenters the sleep mode (step 130) and continues monitoring status (step 116).

If the periodically-determined location coordinates indicate that the trailer 38 has moved outside a boundary of a predetermined area, also referred to as a "geofence" (step 124), then the third data packet also includes a value indicating a geofence violation (step 126).

In some embodiments, while in the sleep mode after decoupling from the truck 40, an ongoing function provided by the CPU 18 is to monitor the output of the motion sensor 46 to determine if the trailer 38 is moved (step 130). Upon sensing that the trailer 38 has moved based on the output of the motion sensor 46, the trailer tracking device 12 wakes up and acquires its location coordinates (step 122), and transmits a fourth data packet to the central monitoring station 50 (step 128). The fourth data packet preferably includes at least the location coordinates of the trailer 38, the unique identification/serial number of the trailer tracking device 12, a value indicating that motion was detected by the motion sensor 46, and a time stamp. After transmitting the fourth data packet, the trailer tracking device 12 reenters the sleep mode (step 130) and continues monitoring status (step 116).

If the location coordinates indicate that the trailer 38 has moved outside the boundary of a geofence (step 124) then the fourth data packet also includes a value indicating a geofence violation (step 126).

Upon receipt of the fourth data packet, the central monitoring station 50 may send an alert message to the customer device 56, such as via email or text message, indicating that the trailer to which the tracking device 12 identified in the second data packet has moved (step 132). The alert message may also indicate the location of the tracking device 12.

In some embodiments, while in the sleep mode after decoupling from the truck 40, an ongoing function provided by the CPU 18 is to monitor the backup battery voltage to determine whether the voltage has dropped below a predetermined minimum threshold (step 134). Upon sensing that the battery voltage has dropped below the threshold, the tracking device 12 wakes up and determines its location coordinates (step 122), and transmits a fifth data packet to the central monitoring station 50 (step 128). The fifth data packet preferably includes at least the location coordinates of the trailer 38, the unique identification/serial number of the trailer tracking device 12, a value indicating the battery voltage, and a time stamp. After transmitting the fifth data packet, the trailer tracking device 12 reenters the sleep mode (step 130) and continues monitoring status (step 116).

Upon receipt of the fifth data packet, the central monitoring station 50 may send a message to the customer device 56, such as via email or text message, indicating that the backup battery should be replaced in the trailer tracking device 12 identified in the sixth data packet (step 132). The message may also indicate the location of the tracking device 12.

As discussed above, one way to determine that the trailer 38 has been decoupled from the truck 40 (steps 108 or 118) is to sense the breaking of a wired connection, such as disconnection of the harness 36. In other embodiments, where communication between the trailer tracking device 12 and the truck tracking device 14 is via Bluetooth, Wi-Fi, RFID, or other wireless communication means, loss of the wireless signal between the short-range communication interfaces 22 and 32 could be used to indicate decoupling and separation of the trailer 38 from the truck 40.

In an alternative embodiment, when a trailer 38 is coupled to a truck 40 and the harness 36 is initially connected, the truck tracking device 14 accesses the unique identification/serial number of the trailer tracking device 12 via the short range communication interfaces 32 and 22. The truck tracking device 14 then transmits a first data packet via the long-range communication interface 20 to the central monitoring station 50 indicating that the trailer 38 and truck 40 are connected. This first data packet preferably includes the unique identification/serial number of the trailer tracking device 12, the unique identification/serial number of the truck tracking device 14, current location coordinates acquired from the GPS module 36, and a time stamp.

In yet another alternative embodiment, when a trailer 38 is coupled to a truck 40 and the harness 36 is initially connected, the truck tracking device 14 accesses the unique identification/serial number of the trailer tracking device 12, and the trailer tracking device 12 accesses the unique identification/serial number of the truck tracking device 14, both via the short range communication interfaces 32 and 22. Both tracking devices 12 and 14 then transmit first data packets via their long-range communication interfaces 20 and 30 to the central monitoring station 50 indicating that the trailer 38 and truck 40 are coupled.

Thus, based on the automatic generation of the first data packets, second data packets, third data packets, fourth data packets, and fifth data packets, the central monitoring station 50 receives (1) event-based notifications when trailers are coupled; (2) event-based notifications when trailers are decoupled from trucks; (3) periodic notifications indicating the locations of trailers after the trailers are decoupled from trucks; (4) notifications when motion sensors indicate trailer movement; (5) notifications when GPS coordinates indicate trailer movement beyond a geofence boundary; and (6) notifications indicating low-battery conditions in the trailer tracking devices.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention.

What is claimed is:

1. A method for communicating information between a trailer tracking device attached to a cargo trailer, one or more truck tracking devices attached to one or more trucks that are operable to haul the cargo trailer, a server computer of a service provider, and a customer device, the method comprising:

(a) at least some components of the trailer tracking device operating in a low-power mode to minimize power consumption when the cargo trailer is not coupled to any of the one or more trucks;
(b) detecting that the cargo trailer has become coupled to one of the one or more trucks;
(c) caused by the occurrence of step (b):
(c1) the trailer tracking device accessing a unique identifier of a truck tracking device attached to the truck to which the cargo trailer is coupled; or
(c2) the truck tracking device accessing a unique identifier of the trailer tracking device;
(d) one or both of the trailer tracking device and the truck tracking device wirelessly transmitting a first data message containing at least the unique identifier of the truck tracking device and the unique identifier of the trailer tracking device;
(e) receiving at the server computer at least the unique identifier of the truck tracking device and the unique identifier of the trailer tracking device contained in the first data message;
(f) associating the unique identifier of the truck tracking device with the unique identifier of the trailer tracking device in a database accessible to the server computer,
(g) after step (d), detecting that the cargo trailer has become decoupled from the truck;
(h) caused by the occurrence of step (g), one or both of the trailer tracking device and the truck tracking device transmitting a second data message containing at least the unique identifier of the trailer tracking device and information indicating that the cargo trailer has become decoupled from the truck;
(i) after step (h), at least some components of the trailer tracking device going into a low-power mode;
(j) receiving at the server computer the unique identifier of the trailer tracking device and the information indicating that the cargo trailer has become decoupled from the truck;
(k) disassociating the unique identifier of the truck tracking device from the unique identifier of the trailer tracking device in the database; and
(l) the server computer sending information to the customer device indicating that the cargo trailer has become decoupled from the truck.

2. The method of claim 1 further comprising the server computer providing information to the customer device indicating that the cargo trailer has been coupled to the truck to which the truck tracking device is attached.

3. The method of claim 2 further comprising the server computer providing the information to the customer device via one or more of a webpage, an email message, a text message, and an instant message.

4. The method of claim 1 wherein step (c) comprises accessing the unique identifier using wired or wireless communication means.

5. The method of claim 1 wherein step (d) comprises transmitting the first data message including location coordinates of the trailer tracking device and information indicating that the cargo trailer has changed from a decoupled state to a coupled state.

6. The method of claim 1 wherein components of the trailer tracking device that go into a low-power mode in step (i) include a GPS module and one or more wireless communication interfaces.

7. A method for communicating information between a trailer tracking device attached to a cargo trailer, one or more truck tracking devices attached to one or more trucks that are operable to haul the cargo trailer, a server computer of a service provider, and a customer device, the method comprising:
- (a) at least some components of the trailer tracking device operating in a low-power mode to minimize power consumption when the cargo trailer is not coupled to any of the one or more trucks;
- (b) detecting that the cargo trailer has become coupled to one of the one or more trucks;
- (c) caused by the occurrence of step (b):
  - (c1) the trailer tracking device accessing a unique identifier of a truck tracking device attached to the truck to which the cargo trailer is coupled; or
  - (c2) the truck tracking device accessing a unique identifier of the trailer tracking device;
- (d) one or both of the trailer tracking device and the truck tracking device wirelessly transmitting a first data message containing at least the unique identifier of the truck tracking device and the unique identifier of the trailer tracking device;
- (e) receiving at the server computer at least the unique identifier of the truck tracking device and the unique identifier of the trailer tracking device contained in the first data message;
- (f) associating the unique identifier of the truck tracking device with the unique identifier of the trailer tracking device in a database accessible to the server computer;
- (g) after step (d), detecting that the cargo trailer has become decoupled from the truck;
- (h) caused by the occurrence of step (g), one or both of the trailer tracking device and truck tracking device determining location coordinates of a location at which the trailer becomes decoupled from the truck;
- (i) one or both of the trailer tracking device and the truck tracking device transmitting a third data message containing at least the unique identifier of the trailer tracking device and the location coordinates determined in step (h);
- (j) after step (i), at least some components of the trailer tracking device going into a low-power mode;
- (k) at least some components of the trailer tracking device periodically coming out of the low-power mode to determine location coordinates of the trailer tracking device;
- (l) at least some components of the trailer tracking device periodically coming out of the low-power mode to transmit the third data message containing at least the unique identifier of the trailer tracking device and the location coordinates of the trailer tracking device; and
- (m) receiving at the server computer at least the unique identifier of the trailer tracking device and the location coordinates of the trailer tracking device contained in the third data message.

8. The method of claim 7 further comprising:
- (n) determining that the cargo trailer has gone outside a predetermined boundary based on the location coordinates of the trailer tracking device; and
- (o) the server computer providing information to the customer device indicating that the cargo trailer has gone outside the predetermined boundary.

9. The method of claim 8 wherein the determining of step (n) is performed by the trailer tracking device, and the third data message transmitted from the trailer tracking device includes information indicating that the cargo trailer has gone outside the predetermined boundary.

10. The method of claim 8 wherein the determining of step (n) is performed by the server computer.

11. A method for communicating information between a trailer tracking device attached to a cargo trailer, one or more truck tracking devices attached to one or more trucks that are operable to haul the cargo trailer, a server computer of a service provider, and a customer device, the method comprising:
- (a) at least some components of the trailer tracking device operating in a low-power mode to minimize power consumption when the cargo trailer is not coupled to any of the one or more trucks;
- (b) detecting that the cargo trailer has become coupled to one of the one or more trucks;
- (c) caused by the occurrence of step (b):
  - (c1) the trailer tracking device accessing a unique identifier of a truck tracking device attached to the truck to which the cargo trailer is coupled; or
  - (c2) the truck tracking device accessing a unique identifier of the trailer tracking device;
- (d) one or both of the trailer tracking device and the truck tracking device wirelessly transmitting a first data message containing at least the unique identifier of the truck tracking device and the unique identifier of the trailer tracking device;
- (e) receiving at the server computer at least the unique identifier of the truck tracking device and the unique identifier of the trailer tracking device contained in the first data message;
- (f) associating the unique identifier of the truck tracking device with the unique identifier of the trailer tracking device in a database accessible to the server computer;
- (g) after step (d), detecting that the cargo trailer has become decoupled from the truck;
- (h) caused by the occurrence of step (g), at least some components of the trailer tracking device going into a low-power mode;
- (i) the trailer tracking device sensing motion of the cargo trailer;
- (j) caused by the occurrence of step (i), at least some components of the trailer tracking device coming out of the low-power mode to determine location coordinates of the trailer tracking device and transmit a fourth data message containing at least the unique identifier of the trailer tracking device, the location coordinates of the trailer tracking device, and information indicating the motion of the cargo trailer was sensed; and
- (k) receiving at the server computer at least the unique identifier of the trailer tracking device, the location coordinates of the trailer tracking device contained in the fourth data message, and the information indicating the motion of the cargo trailer was sensed.

12. The method of claim 11 further comprising:
- (l) determining that the cargo trailer has gone outside a predetermined boundary based on the location coordinates of the trailer tracking device;
- (m) the server computer providing information to the customer device indicating that the cargo trailer has gone outside the predetermined boundary.

13. The method of claim 12 wherein the determining of step (l) is performed by the trailer tracking device, and the fourth data message transmitted from the trailer tracking device includes information indicating that the cargo trailer has gone outside the predetermined boundary.

14. The method of claim 12 wherein the determining of step (l) is performed by the server computer.

15. A method for communicating information between a trailer tracking device attached to a cargo trailer, one or more truck tracking devices attached to one or more trucks that are operable to haul the cargo trailer, a server computer of a service provider, and a customer device, the method comprising:

(a) at least some components of the trailer tracking device operating in a low-power mode to minimize power consumption when the cargo trailer is not coupled to any of the one or more trucks;

(b) detecting that the cargo trailer has become coupled to one of the one or more trucks;

(c) caused by the occurrence of step (b):
  (c1) the trailer tracking device accessing a unique identifier of a truck tracking device attached to the truck to which the cargo trailer is coupled; or
  (c2) the truck tracking device accessing a unique identifier of the trailer tracking device;

(d) one or both of the trailer tracking device and the truck tracking device wirelessly transmitting a first data message containing at least the unique identifier of the truck tracking device and the unique identifier of the trailer tracking device;

(e) receiving at the server computer at least the unique identifier of the truck tracking device and the unique identifier of the trailer tracking device contained in the first data message;

(f) associating the unique identifier of the truck tracking device with the unique identifier of the trailer tracking device in a database accessible to the server computer;

(g) after step (d), detecting that the cargo trailer has become decoupled from the truck;

(h) caused by the occurrence of step (g), at least some components of the trailer tracking device going into a low-power mode;

(i) determining that a voltage level of a battery providing power to the trailer tracking device has dropped below a threshold level;

(j) caused by the occurrence of step (i), at least some components of the trailer tracking device coming out of the low-power mode to determine location coordinates of the trailer tracking device;

(k) caused by the occurrence of step (i), at least some components of the trailer tracking device coming out of the low-power mode to transmit a fifth data message containing at least the unique identifier of the trailer tracking device, the location coordinates of the trailer tracking device, and information indicating a low voltage level of the battery; and (l) receiving at the server computer at least the unique identifier of the trailer tracking device, the location coordinates of the trailer tracking device contained in the fifth data message, and the information indicating a low voltage level of the battery.

16. A method for communicating information between a trailer tracking device attached to a cargo trailer, one or more truck tracking devices attached to one or more trucks that are operable to haul the cargo trailer, a server computer of a service provider, and a customer device, the method comprising:

(a) at least some components of the trailer tracking device operating in a low-power mode to minimize power consumption when the cargo trailer is not coupled to any of the one or more trucks;

(b) detecting that the cargo trailer has become coupled to one of the one or more trucks;

(c) caused by the occurrence of step (b):
  (c1) the trailer tracking device accessing a unique identifier of a truck tracking device attached to the truck to which the cargo trailer is coupled; or
  (c2) the truck tracking device accessing a unique identifier of the trailer tracking device;

(d) one or both of the trailer tracking device and the truck tracking device wirelessly transmitting a first data message containing at least the unique identifier of the truck tracking device, the unique identifier of the trailer tracking device, location coordinates of the trailer tracking device, and information indicating that the cargo trailer has changed from a decoupled state to a coupled state;

(e) receiving at the server computer at least the unique identifier of the truck tracking device and the unique identifier of the trailer tracking device contained in the first data message;

(f) associating the unique identifier of the truck tracking device with the unique identifier of the trailer tracking device in a database accessible to the server computer;

(g) the server computer providing information to the customer device indicating that the cargo trailer has been coupled to the truck to which the truck tracking device is attached, the information provided to the customer device via one or more of a webpage, an email message, a text message, and an instant message;

(h) after step (d), detecting that the cargo trailer has become decoupled from the truck;

(i) caused by the occurrence of step (h), one or both of the trailer tracking device and the truck tracking device transmitting a second data message containing at least the unique identifier of the trailer tracking device and information indicating that the cargo trailer has become decoupled from the truck;

(j) after step (i), at least some components of the trailer tracking device going into a low-power mode;

(k) receiving at the server computer the unique identifier of the trailer tracking device and the information indicating that the cargo trailer has become decoupled from the truck;

(l) disassociating the unique identifier of the truck tracking device from the unique identifier of the trailer tracking device in the database; and (m) the server computer sending information to the customer device indicating that the cargo trailer has become decoupled from the truck.

17. The method of claim 16 further comprising:

(n) after step (j), at least some components of the trailer tracking device periodically coming out of the low-power mode to determine location coordinates of the trailer tracking device;

(o) after step (j), at least some components of the trailer tracking device periodically coming out of the low-power mode to transmit a third data message containing at least the unique identifier of the trailer tracking device and the location coordinates of the trailer tracking device; and (p) receiving at the server computer at least the unique identifier of the trailer tracking device and the location coordinates of the trailer tracking device contained in the third data message.

18. The method of claim 16 further comprising:

(n) after step (j), the trailer tracking device sensing motion of the cargo trailer;

(o) caused by the occurrence of step (n), at least some components of the trailer tracking device coming out of the low-power mode to determine location coordinates of the trailer tracking device and transmit a fourth data message containing at least the unique identifier of the trailer tracking device, the location coordinates of the trailer tracking device, and information indicating the motion of the cargo trailer was sensed; and (p) receiving at the server computer at least the unique identifier of the trailer tracking device, the location coordinates of the trailer tracking device contained in the fourth data message, and the information indicating the motion of the cargo trailer was sensed.

19. The method of claim 16 further comprising:

(n) after step (j), determining that a voltage level of a battery providing power to the trailer tracking device has dropped below a threshold level;

(o) caused by the occurrence of step (n), at least some components of the trailer tracking device coming out of the low-power mode to determine location coordinates of the trailer tracking device;

(p) caused by the occurrence of step (n), at least some components of the trailer tracking device coming out of the low-power mode to transmit a fifth data message containing at least the unique identifier of the trailer tracking device, the location coordinates of the trailer tracking device, and information indicating a low voltage level of the battery; and (q) receiving at the server computer at least the unique identifier of the trailer tracking device, the location coordinates of the trailer tracking device contained in the fifth data message, and the information indicating a low voltage level of the battery.

* * * * *